(12) United States Patent
Takala et al.

(10) Patent No.: US 6,788,294 B2
(45) Date of Patent: Sep. 7, 2004

(54) DEVICE AND METHOD FOR IMPLEMENTING A KEY

(75) Inventors: Roope Takala, Espoo (FI); Antti Kujala, Helsinki (FI)

(73) Assignee: Nokia Mobile Phones Ltd., Espoo (FI);

( * ) Notice: Subject to any disclaimer, the term of this patent is extended or adjusted under 35 U.S.C. 154(b) by 257 days.

(21) Appl. No.: 09/853,384

(22) Filed: May 11, 2001

(65) Prior Publication Data

US 2001/0040558 A1 Nov. 15, 2001

(30) Foreign Application Priority Data

May 15, 2000 (FI) .............................................. 20001156

(51) Int. Cl.$^7$ ................................................. G09G 5/00
(52) U.S. Cl. .................... 345/173; 345/168; 341/32; 341/34; 400/491; 400/494; 200/512
(58) Field of Search ................................ 345/156, 168, 345/173; 340/407.1, 592, 407.2, 825; 400/494, 472, 473, 491, 491.1; 434/112–115; 341/20–22; 364/189

(56) References Cited

U.S. PATENT DOCUMENTS

| 5,580,251 A | * 12/1996 | Gilkes et al. ................ 434/113 |
| 5,958,154 A | 9/1999 | O'Handley et al. .......... 148/312 |
| 6,295,167 B1 | * 9/2001 | Uematsu et al. ............. 359/665 |
| 6,437,485 B1 | * 8/2002 | Johansson ..................... 310/332 |
| 6,515,382 B1 | * 2/2003 | Ullakko ........................ 310/26 |
| 6,535,201 B1 | * 3/2003 | Cooper et al. ............... 345/173 |

FOREIGN PATENT DOCUMENTS

| EP | 0775049 B1 | 5/1997 | |
| JP | 03129386 A | * 6/1991 | ................ 345/173 |
| WO | WO 96/05045 | 2/1996 | |
| WO | WO 98/08261 | 2/1998 | |
| WO | WO 99/45631 | 9/1999 | |

* cited by examiner

Primary Examiner—Kent Chang
Assistant Examiner—Tom Sheng
(74) Attorney, Agent, or Firm—Perman & Green, LLP

(57) ABSTRACT

A device and method for implementing a key, in which a field applied to a layer comprising a material whose volume is responsive to the magnitude of field is altered at a specified position to create a key in said position; said field being one of the following: electric field, magnetic field, both of the above.

31 Claims, 3 Drawing Sheets

DEVICE AND METHOD FOR IMPLEMENTING A KEY

FIELD OF THE INVENTION

The present invention relates to a device and method for implementing a key in a keypad.

BACKGROUND OF TECHNOLOGY

Many electronic devices include a user interface to implement functionality for user input and output. There are various ways of implementing the user interface, utilizing communication by voice, picture, text, the sense of touch or other signalling methods. The most common type of user interface continues to be based on key functions implemented by means of a key pad; the device outputs data to the display, and the user enters input in the form of alphanumeric characters, using the key pad.

A touch screen is a type of combination of key pad and display; the display is typically fitted with a sensor matrix to detect finger presses on the screen surface and indicate their position. The display control system has been programmed to recognize finger presses on a certain area of the screen as commands for the user interface; the user can input data by touching certain areas indicated on the screen. Thus, one of the benefits of a touch screen over a conventional combination of a key pad and display is that the former can be customized in software, by using so-called SOFT keys. On a touch screen, the user interface can at one moment be a game controller, on another moment it may represent a Chinese keyboard.

A disadvantage of the touch screen compared with a conventional combination of a key pad and display is that the touch screen is unable to give the user a feeling of the key presses. By grounds of its accuracy, key operation based on the sense of touch feels familiar and reliable for the users. Users want the keys to be distinguishable from the underlying surface and to move down with the key presses. Touch screens also cause problems for the weak-eyed, who are unable to distinguish adjacent option keys from each other by the sense of touch.

SUMMARY OF THE INVENTION

Now, a device and method has been invented for implementing a key that enables customization of the key—and thus the whole user interface—just as in the case of touch screens, and provides the possibility to operate the key relying on the sense of touch.

According to a first aspect of the invention, there is implemented a key element that characteristically comprises a first layer comprising a material whose volume is responsive to the magnitude of field, said field being one of the following: electric field, magnetic field, both of the above; and means for altering the field in a wanted position in said layer in order to create a key in that position.

According to a second aspect of the invention, there is implemented a key element that characteristically comprises a first layer comprising a material whose volume is responsive to the magnitude of field, said field being one of the following: electric field, magnetic field, both of the above; means for detecting a press and means for altering said field to create a pressing of the key in response to the detected key press.

According to a third aspect of the invention, there is implemented a method for implementing a key that characteristically comprises the alteration of a field applied at a certain position to a first layer comprising a material whose volume is responsive to the magnitude of the field, to create a key in said position; said field being one of the following: electric field, magnetic field, both of the above.

According to a fourth aspect of the invention, there is implemented an electronic device that characteristically comprises a layer comprising a material whose volume is responsive to the magnitude of field, said field being one of the following: electric field, magnetic field, both of the above; and means for altering the field in a wanted position in said layer to create a key in that position.

According to a fifth aspect of the invention, there is implemented a manufacturing method for manufacturing a key element, the method characteristically comprising the joining of a layer of a material whose volume is responsive to the magnitude of field with means for altering said field, the field being one of the following: electric field, magnetic field, both of the above.

A preferred embodiment of the invention utilizes material whose volume is responsive to the magnitude of an electric field, so-called MSM material (Magneto Straining Material). It is also possible to alter the volume of many of these materials by altering the magnitude of a magnetic field applied to the material. A characteristic of MSM materials is the change in volume in connection with the changes to an electric field, magnetic field or both fields applied to the material. An example of such a material whose volume is responsive to the magnitude of field is the material $Ni_2MnGa$, featured in publication WO 99/45631; by redirecting the dual structure of the material using an electric field, a reversible change in the material volume can be obtained. In prior art, it is commonly known that there are materials whose changes in volume are irreversible, i.e., the material will not return to its original size even if the electric and/or magnetic field applied to the material would return to its original magnitude. One of these irreversible materials is Polypyrol.

A preferred embodiment additionally utilizes material whose electrical conductivity is responsive to pressure, so-called ER material (elastoresistive material). A characteristic of these materials is that the electrical conductivity of the material changes in connection with changes to the pressure applied to the material. The position of pressure applied to the material, e.g., a press of a finger, can be determined preferably by means of a conductor matrix connected to the material. Another preferred alternative for the detection of finger presses is, for example, the use of ElectroMechanical Film (EMFi) material, as featured in publication EP 775049. Whereas the electrical conductivity of ER material increases in connection with the increase in pressure applied to the material, EMFI material directly produces electricity from pressure, i.e., EMFI material produces an electrical voltage when compressed or moved. Also the detection of pressure is done in a slightly different way with these materials; whereas EMFI material directly produces electricity when pressed, and this electricity can be detected and its position determined with a conductor matrix, with ER material it is required to feed the conductor matrix with external current that is transmitted from one conductor to another through the ER membrane at a crossing point of the conductors when pressed.

A preferred embodiment of the invention also utilizes a membrane created with so-called electronic ink (E-ink). An image is created on the E-ink membrane by using an electric field to control micro-capsuled color cells in the membrane;

one part of the capsules comprises dark-colored cells, and another part comprises light-colored cells. By turning these micro-capsules to different positions, it is possible to create different shades of dark and light areas on the membrane, as in a conventional black-and-white television. Electronic paper has been discussed, for example, in the article "Digital Ink Grants every Whim", published in the Financial Times on Mar. 11, 1996.

In a preferred embodiment, the device and method are used as the user interface of an electronic device. The key that is the object of the invention has the characteristic feature that it can be customized whenever necessary, so a separate user interface is not necessary when the requirements change. In case of a key pad implemented according to this invention, language-specific settings, for example, can be done preferably when the key pad is sold to the customer; this covers, for example, the language that the key pad supports, be it Chinese, Spanish or English. There is no need to stock different key pads for different languages any longer.

The key that is the object of this invention principally works in the same way as current keys in key pads; the selectors are clearly distinguished from the surrounding surface by their height. The differences in the key surfaces create a clear user interface where the boundaries between different selectors are clearly distinguishable and detectable by touch. In addition, when pressing the selector, it will preferably move down, which confirms the user that the pressing operation has been successful.

The key that is the object of the invention can also be employed for the common control of various electronic devices. An user interface comprising keys can at one time be used as the keyboard of a computer, at another time as a game controller with a few selectors, and at a third time as the remote control for a text TV set. With digital convergence, the benefit gained from a user interface adaptable to the situation and environment will increase in the future. Digital convergence means the integration of various different electronic devices into one common device, for example, the integration of a computer, a mobile phone, a PDA and a camera into a single device. Devices created for different purposes require different user interfaces, though, and using prior art solutions, a common integrated user interface would require lots of tradeoffs between the user interfaces of the different devices; this would render the user interface inconvenient and user-unfriendly. However, a user interface implemented using the key according to the invention makes it possible to integrate different electronic devices into one in such a way that all the devices can retain their separate user interfaces. This means that it is not required to attempt to use a camera, for example, by means of a computer keyboard unsuitable for the purpose; when changing over from the computer application to the camera application, the user interface can preferably be changed from a word processor keyboard, for example, into a camera user interface.

The layered key element for the key that is the object of the invention can be created preferably by sandwiching a layer of a material whose volume is responsive to the magnitude of an electric or magnetic field and a layer of a material whose electrical conductivity is responsive to pressure, with electric or magnetic field matrices controlling these layers and constructed from a set of electrodes and/or coils when using a magnetic field; these can preferably be active or passive matrices. In addition to these layers, an E-ink layer can be preferably sandwiched on the key element; this makes it possible to integrate a display with the key element. A layer of material can be preferably placed below the E-ink layer and its control matrix, comprising a material whose volume expands with the added magnitude of an electric or magnetic field, and a matrix controlling this layer of material. An ER layer can be preferably placed under these layers, comprising a material whose electrical conductivity increases with increasing pressure. On both sides of the ER layer, parallel conductor field layers will be placed in a perpendicular orientation with each other. A material layer comprising a material whose volume decreases with the added magnitude of an electric and/or magnetic field, and a matrix controlling this layer, will be preferably placed at the bottom.

Using the method according to the invention, the key can be made to operate by raising the selector from the surrounding surface, using the appropriate control matrix to increase the magnitude of the electric or magnetic field applied to the layer comprising a material whose volume expands with the added magnitude of the electric and/or magnetic field. The press of the selector can be preferably detected and located as a local increase of electrical conductivity in the ER layer, using constant voltage between the perpendicularly oriented conductor layers surrounding the ER layer. The down movement of the key can be achieved by increasing the magnitude of the electric and/or magnetic field applied to the layer of material whose volume decreases with an increase in the magnitude of the electric and/or magnetic field, in the position where the local increase of electrical conductivity was detected in the ER layer. As a consequence of this, said layer of material will be compressed at the position of the key press, which means that the key is able to move down and give the user the feeling that the key press was successful. Correspondingly, as the electrical conductivity of the ER layer returns to normal, the magnitude of the electric or magnetic field applied to the layer of material whose volume decreases with an increase in the magnitude of the electric and/or magnetic field, in the position where the local increase of electrical conductivity was detected in the ER layer, will also be returned to its normal value. As a consequence of this, the thickness of said layer of material will return to its original value, which causes the key to return up to its original position.

One benefit of the key that is the object of the invention is its very wide applicability for installation to various places. Because the key-based user interface has a flat surface when the electric field is switched off, it can be preferably embedded, for example, in a table-top, a wall or a piece of furniture. The material can also be effectively used for coating a monitor surface, a mobile phone or another electronic device. The benefits of this method include the savings in component usage with the integration of various devices, as the same components can be used to implement various software-controlled tasks to a greater extent.

By using the key device that is the object of the invention, an electronic drawing board can be preferably implemented using the configuration described above. In the drawing board application, at least a part of the key element will be left as a flat drawing surface, on which it is possible to draw preferably by pressing the surface with a suitable pen or a finger, for example. The pressure on the surface can be effectively detected in the ER layer, and the surface can be raised up at the position of pressure by increasing the magnitude of the electric and/or magnetic field applied to the layer comprising a material whose volume expands with the added magnitude of the electric and/or magnetic field, thus creating a three-dimensional plot. It is also possible to preferably determine the height of the raised surface based on the magnitude or the duration of the key press, which may be used to improve visualization by varying the output height from the surface. If three-dimensionality is not needed, but a drawing plot is enough, this can be achieved effectively by controlling the imaging in the E-ink layer. This can be preferably implemented in the matrix controlling the E-ink layer, e.g., by darkening the surface at the touched spot and keeping the background light, or vice versa. If desired, the darkness of the touched spot can also be preferably adjusted based on the magnitude or duration of the touch, for example.

By implementing the device that is the object of the invention, it is also possible to preferably implement a user interface for the weak-eyed. This can be preferably achieved by raising areas or letters up from the user interface surface—the weak-eyed user could interpret these by the sense of touch in fingers. It would be possible to preferably implement this by using an application controlling the magnitude of the electric field applied to a layer of material whose volume increases with the increase of magnitude in the electric field, to represent the desired information in an area of the user interface surface.

It is even possible to generate sound with the device that is the object of the invention.

The sound generating function can be preferably generated by quickly moving the surface of the layered material element that is the object of the invention, like a loudspeaker cone, by quickly varying the magnitude of an electric and/or magnetic field applied to the layer or layers of material whose volume is responsive to the magnitude of an electric and/or magnetic field. The device that is the object of the invention can also be used for implementing noise-cancelling generators.

BRIEF DESCRIPTION OF THE DRAWINGS

In the following, the present invention will be discussed in detail by referring to the enclosed drawings, in which.

DETAILED DESCRIPTION

Figure 1:
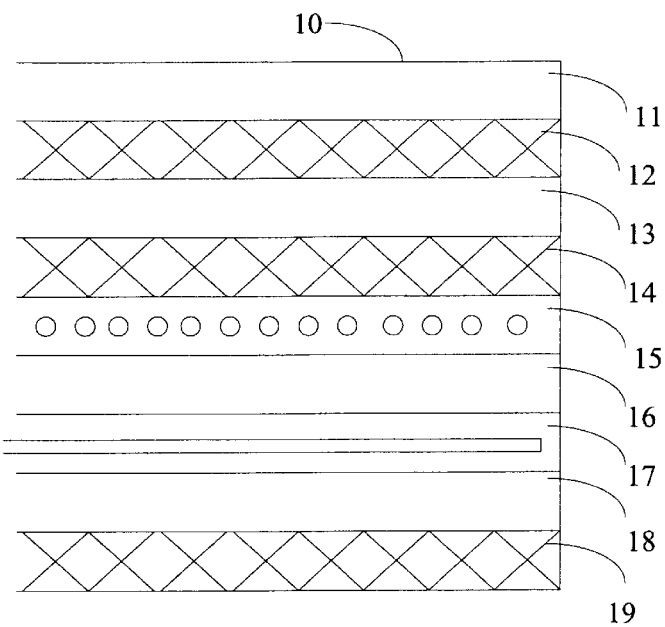
FIG. 1 shows the layered key element according to the invention.

FIG. 1 shows the layered key element according to the invention. The key element according to the invention 10 comprises a top layer of E-ink material 11 that can be used to display patterns such as text on the surface of the key element, by appropriately placing the micro-capsuled pixels in the E-ink layer. The micro-capsuled pixels that form the image in the E-ink layer 11, are controlled by an electric field matrix 12, formed of a set of electrodes. An alternative method of representing images and text in the device according to the invention would be a plastic-based flexible liquid crystal display (LCD). Currently, these flexible, so-called Cholestric LCD displays are already bendable and rollable. It is also assumed that stretchability will be implemented soon, if not already; this means that a Cholestric LCD display could be used as an alternative for implementing the display in the device according to the invention.

The layered key element according to the invention also preferably comprises a layer of material 13 whose volume is responsive to the magnitude of an electric and/or magnetic field, the purpose of this layer being to raise a certain area of the key element surface from the surrounding area and thus indicate an area of the surface that can be used, e.g., as a selector. Said layer 13 of the key element is preferably a material whose volume increases with the added magnitude of an electric and/or magnetic field and decreases with a decrease in the magnitude of such a field. Even though said layer 13 of the key element has been placed preferably below the E-ink layer in the figure, it is also possible to arrange for a preferred placement of this layer somewhere else than directly below the E-ink layer. The layer comprising material whose volume is responsive to field magnitude is controlled by an electric and/or magnetic field matrix 14 that is formed of a set of electrodes and/or coils. The field matrix 14 is, preferably, a passive or active matrix known from prior art. An increase in the electric and/or magnetic field in a given position of the matrix will increase the volume of the layer of material whose volume is responsive to field magnitude, in the corresponding position.

A layered key element according to the invention also comprises, preferably, a layer of material 16 that comprises material whose electrical conductivity is responsive to pressure, a so-called ER layer 16 (ER, Elasto Resistive). The ER layer can be preferably used for detecting a press and/or touch and determine its position on the surface of the layered key element 10. Detection of the press is based on the fact that with an increase in pressure, the electrical current between the conductor layers 15, 17 surrounding the ER layer will increase as the voltage between these conductor layers remains constant. The conductor layers 15, 17 are arranged preferably in such a way that all conductors in one layer run parallel to each other and that the conductors in the conductor layers 15, 17 surrounding the ER layer run in a perpendicular direction to each other. This arrangement brings the benefit that a local increase in conductivity in the ER layer 16, caused by the key press, can be located using the matrix-like two-layer conductor structure by detecting the increase of current in both the vertical and horizontal conductors.

The material whose volume is responsive to the magnitude of electric field will increase in volume when the magnitude of the electric field increases in the controlling matrix; the other way, the material is also able to generate an electric field opposite the one in the controlling matrix when pressure is applied to the material. Based on this characteristic, it is possible to arrange the detection of the key press preferably in the electric field matrix 14 controlling the layer 13 of material whose volume is responsive to the magnitude of an electric field. It would thus be possible to detect the key press by means of electric field sensors installed in the electric field matrix 14 controlling the layer 13, or by coating the surface with a touch-sensitive material known from prior art. This means that a layered key element according to the invention will be operative also without an ER layer, and thus, such a key element without an ER layer will also fall into the scope of this invention.

The layered key element according to the invention also comprises a layer of material 18 whose volume is responsive to the magnitude of an electric and/or magnetic field, its volume increasing with a decrease in the magnitude of the field and decreasing with an increase in the magnitude of the field. By using layer 18, it is possible to make the raised selector, e.g. a key created with layer 13 to move down when pressed. This is achieved by first detecting the press and determining its position as described above; then, the magnitude of the press can be determined effectively from the increase in electrical conductivity. The magnitude of the press can be preferably determined by deducing the ratio between pressure and electrical conductivity, and using this ratio to calculate the pressure when the change in electrical conductivity is known. When the position and magnitude of the key press is known, the magnitude of the electric and/or magnetic field applied to the layer 18 of material whose volume is responsive to said magnitude of field can be increased at the detected position of the key press by an amount that is proportional to the magnitude of the key press; this will make the material in layer 18 to contract and the raised selector to move down to the pit created in said position by the increase in field magnitude. Layer 18 is controlled by matrix 19, comprising a set of electrodes and/or coils for generating an electric and/or magnetic field to be applied to the layer.

Because the key element according to the invention can be implemented using different layering orders or different layer combinations of the aforementioned layers, or layers exhibiting the same characteristics but comprising different materials, preferably creating the same functionality, these will also fall into the scope of the layered element according to the invention.

Figure 2:
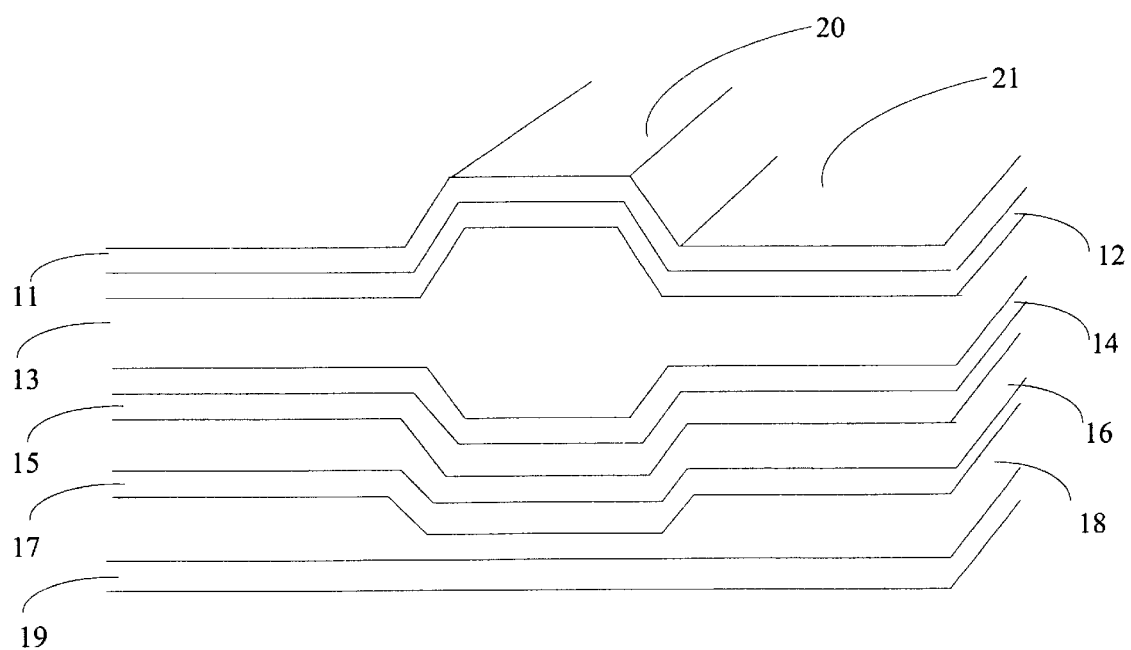
FIG. 2 shows the operating principle of the layered key element according to the invention.

FIG. 2 shows the operating principle of the layered key element according to the invention. The layered key element according to the invention comprises preferably the E-ink layer 11 described above and the electric field matrix 12 which controls the layer 11 to represent information on the surface 21 of the key element. The upward movement of the key 20 and its protruding from the surface 21 can be preferably implemented by increasing the magnitude of the electric and/or magnetic field applied to the layer 13 described above, in the field matrix 14 that controls the layer 13, at the position where the key should protrude from the surface; the field matrix is a electric field and/or magnetic field matrix. The increase in field magnitude causes the material in layer 13 whose volume is responsive to the magnitude of field to increase in volume and thus cause a bulge to the key element at the position where the field magnitude was increased in the field matrix 14 controlling the layer 13.

The key element according to the invention also comprises an ER layer 16, described above, and the surrounding conductor layers 15 and 17 where conductors run perpendicularly to each other, forming a matrix-like structure through the ER layer. The pressure on the key generated by increasing the electric field applied to layer 13 can be detected as an increase in electrical conductivity between the conductors in the conductor layers surrounding the ER layer, at the position of the key in the crossing point of the conductors in the different layers. As mentioned above, the key pressure can also be preferably detected directly from layer 13 by means of sensors measuring the electric field, or by replacing the ER layer and its surrounding conductor layers with a layer of touch-sensitive material, for example.

The key element according to the invention also comprises a layer 18 of material whose volume decreases with an increase in the magnitude of the electric and/or magnetic field, and a field matrix 19 controlling the layer 18, the field matrix being preferably an elecric field matrix and/or a magnetic field matrix. By increasing the magnitude of the field applied to the layer 18 in the field matrix 19, the layer 18 can be made to move downwards and thus give the upper layers the space to move downwards as well. The downward movement of the key created by layer 13 when pressed can thus be generated by increasing the magnitude of the field in layer 18 at the position of the key pressed. The means for detecting the pressure, e.g., the ER layer 16 or a touch-sensitive layer, are functionally connected to the field matrix controlling the layer 18, to transmit the position of pressure where the field magnitude should be increased from the detecting means to the field matrix 19.

Figure 3:
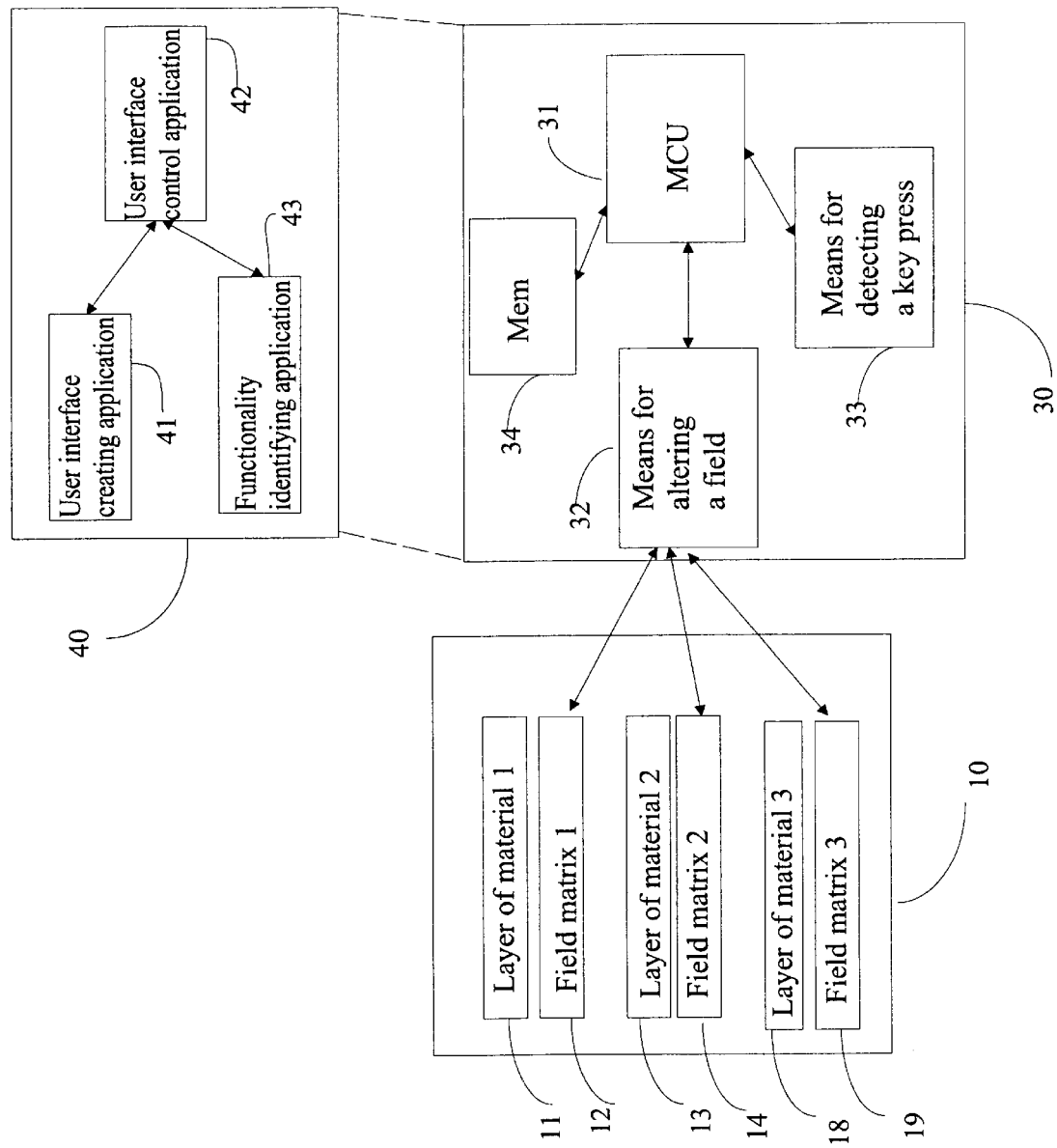
FIG. 3 shows the block diagram of the device according to the invention.

FIG. 3 shows the block diagram of a device that represents an embodiment according to the invention. The device comprises a key element section 10 and a device controlling section 30. The key element section preferably comprises the following parts described above: a first layer of material 11 and a first field matrix 12 controlling the first layer of material, the matrix being preferably an electric field matrix; a second layer of material 13 and a second field matrix 14 controlling the second layer of material, the matrix being preferably an electric field matrix and/or a magnetic field matrix; a third layer of material 18 and a third field matrix 19 controlling the third layer of material, the matrix being preferably an electric field matrix and/or a magnetic field matrix.

The field matrices 12, 14, 19 of the key element part are preferably connected to the means 32 for altering the field in the device controlling section 30 that control the field matrices, these means for altering the field being the controllers of the voltage and current applied to the field matrices as well as a voltage/current source. The means 32 for altering the field are in turn preferably controlled by the device control unit (MCU, Master Controlling Unit) 31 which is connected to the means for altering the field. The device control unit, e.g., a microprocessor, has been programmed by software stored in the memory unit 34 to control the operation of the device by controlling the changes in the volume of the key element 10; this is achieved by altering the magnitudes of fields generated by field matrices 14 and 19 to the layers 13 and 18, using the means 32 for altering the field. In addition to this, the device controlling section 30 contains means 33 for detecting the key press; the means can be effectively implemented as an ER layer 15, as a touch-sensitive layer, or as various sensor-based layer solutions.

FIG. 3 shows the physical block diagram of the device controlling section 30 (lower) and the functional block diagram 40 of the device controlling section 30 (upper). The functional block diagram comprises the functions implemented by software stored in the memory unit 34 to control the user interface 42, to create the user interface 41, and to identify functionalities 43. The aforementioned application for creating the user interface will preferably create a key or keys to the key element, retrieving values for the local fields in the field matrices of the key element from memory; these values will then be input to the means for altering the field. This causes local changes in the volume of the key element, e.g., making keys protrude from the surface of the key element. The aforementioned application for identifying functionalities is connected to the means for detecting pressure and gets responses from these means when they detect a press on the key element. For this coordinate of the key press, the application for identifying functionalities will retrieve from memory a functionality of the user interface or operating system; the operation will continue according to this functionality if the coordinate has been assigned a user interface function. If the coordinate has not been assigned any function in the user interface, the key press at that position will be ignored. The aforementioned user interface control application will be responsible for the general operation of the user interface, and thus corresponds to an operating system.

Figure 4:
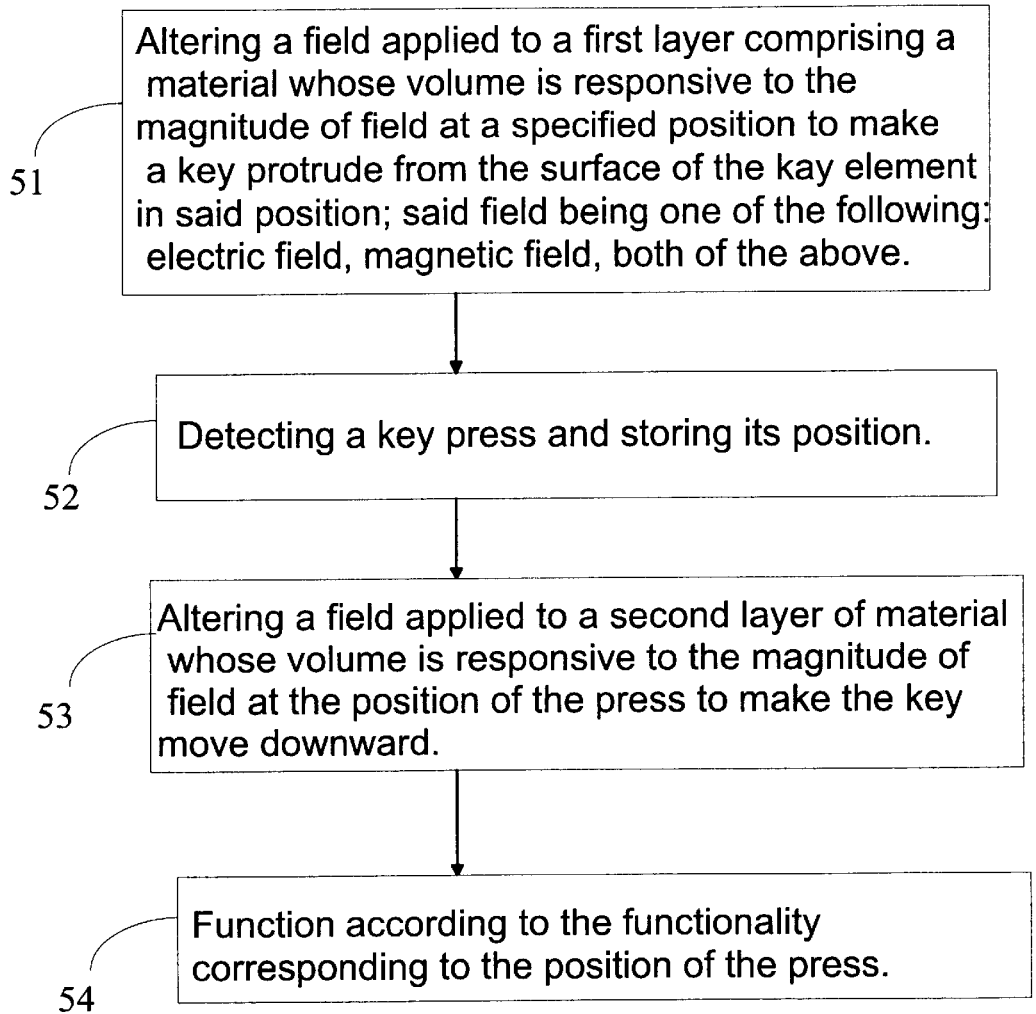
FIG. 4 shows a flow chart of an preferred embodiment of the method according to the invention.

FIG. 4 shows a flow chart of a preferred embodiment of the method according to the invention. The method comprises the alteration of a field, said field being one of the following: electric field, magnetic field, or both of the above, applied to the first layer 13 of material whose volume is responsive to the magnitude of said field, at a certain position, to increase the volume of the material in that position in the appropriate layer, to make a key protrude from the surface of the key element 10 in said position (phase 51). In this context, the alteration of an electric field also covers the generation of an electric field, in addition to changing its magnitude; the same is also true for the alteration of a magnetic field.

The pressure on the key or key element will be preferably detected by the means 33 for detecting pressure, and the position of pressure will be preferably stored into the memory unit 34 (phase 52). The aforementioned means 33 for detecting pressure comprise, e.g., a layer of ER material, a layer of touch-sensitive material, or a material layer comprising a set of pressure-detecting sensors.

If there is a key or other selector in the position of pressure, after detection of the key press, the magnitude of the field will be effectively altered, said field being one of the following: electric field, magnetic field, or both of the above, applied to the second layer 18 of material whose volume is responsive to the magnitude of said field, at the position where pressure was detected, to decrease the volume of the material in that position in the appropriate layer, to make a key move downward under pressure (phase 53). If there is no key or other selector at the position of pressure, the position will not effectively be moved down under pressure.

In the case that there is a key or other type of selector in the position of pressure, the user interface functionality corresponding to the position will be preferably retrieved from memory using the functionality-identifying application; operation will continue according to the functionality corresponding to the position of pressure (phase 54).

When the pressure ends, the field applied to the second layer of material will be returned to its original state; the key will also return to its original state, and the system will wait for a new press on the key or key element.

This paper presents the implementation and embodiments of the invention with the help of examples. A person skilled in the art will appreciate that the present invention is not restricted to details of the embodiments presented above and that the invention can also be implemented in another form without deviating from the characteristics of the invention. The presented embodiments should be regarded as illustrative but not restricting. Thus, the possibilities of implementing and using the invention are only restricted by the enclosed claims, and the various options of implementing the invention as determined by the claims, including the equivalent implementations, also belong to the scope of the invention.

What is claimed is:

1. A key element for pressing by a user, comprising:
   a first layer including material whose volume is responsive to the magnitude of a field, said field being one of the following: electric field, magnetic field, both of the above; and
   means for altering the field in a wanted position in said layer to create a key, for pressing by a user in that position wherein said key is generated by causing an area of the first layer to protrude from the surface, in a specified position in said first layer, for creating a key distinguishable from its surrounding by protruding from the surface.

2. A key element according to claim 1, wherein said layer comprises a material whose volume increases with the added magnitude of said field applied to the layer.

3. A key element according to claim 1, wherein the key element also comprises a field matrix for generating said field in said first layer.

4. A key element according to claim 3, wherein said key is generated by causing an area of the key element to protrude from the surface, in a specified position in said first layer, by using said field matrix to increase the magnitude of said field applied to said first layer in that position.

5. A key element according to claim 3, wherein said field matrix comprises a set of electrodes.

6. A key element according to claim 3, wherein said field matrix comprises a set of conductors.

7. A key element according to claim 3, wherein said field matrix comprises a set of coils.

8. A key element according to claim 1, wherein the key element also comprises a second layer comprising electronically controlled ink (E-ink) and the means for electronically controlling said second layer to display text or images.

9. A key element according to claim 8, wherein said means for controlling comprise a set of electrodes.

10. The key element of claim 1, wherein the means for altering the field is located beneath the first layer.

11. The key element of claim 1, wherein the key for pressing by a user is for inputting information.

12. A key element for pressing by a user, comprising:
    a first layer comprising material whose volume is responsive to the magnitude of a field, said field being one of the following: electric field, magnetic field, both of the above;
    the key element being distinguishable from its surrounding by protruding from the surface;
    means for detecting a press of the key element; and
    means for altering said field to make the volume of the material decrease to make the key element move downward in response to the detected press.

13. A key element according to claim 12, wherein said layer comprises a material whose volume decreases with the added magnitude of said field applied to the layer.

14. A key element according to claim 12, wherein the key element also comprises a field matrix for generating said field in said first layer.

15. A key element according to claim 14, wherein said field matrix has been arranged to increase the magnitude of said field applied to said first layer at the position of pressure, as response to the detection of pressure, to make the key move downward.

16. A key element according to claim 14, wherein said field matrix comprises a set of electrodes.

17. A key element according to claim 14, wherein said field matrix comprises a set of conductors.

18. A key element according to claim 14, wherein said field matrix comprises a set of coils.

19. A key element according to claim 12, wherein said means for detecting pressure have been arranged to detect pressure and its position on the key element.

20. A key element according to claim 12, wherein the key element also comprises a second layer comprising electronically controlled ink (E-ink) and control means for electronically controlling said second layer to display text or images.

21. A key element according to claim 20, wherein said control means for controlling comprises a set of electrodes.

22. A key element according to claim 12, wherein said means for detecting a key press comprises one of the following:
    a layer of touch-sensitive material, a layer of material whose conductivity is responsive to pressure, a layer comprising a set of pressure detecting sensors.

23. The key element of claim 12, wherein the means for altering the field is located beneath the first layer.

24. The key element of claim 12, wherein the key element is for inputting information.

25. A method for creating a key for pressing by a user comprising:

altering a field applied at a specified position to a first layer comprising material whose volume is responsive to the magnitude of a field to create a key in the specified position, said field being one of the following: electric field, magnetic field, both of the above; and distinguishing the key from a surface by causing an area of the first layer to protrude from the surface at the specified position.

26. A method according to claim 25, wherein said layer comprises a material whose volume increases with the added magnitude of said field applied to the layer; whereby in order to create a key the magnitude of said field applied to said first layer is increased.

27. A method according to claim 25, wherein in addition, the method comprises detecting a press on said key, altering said field applied to a second layer of material whose volume is responsive to the magnitude of said field to make said key move downward.

28. A method according to claim 27, wherein said second layer comprises a material whose volume decreases with the added magnitude of said field applied to the layer; whereby for creating the downward movement of the key the magnitude of said field applied to said second layer is increased.

29. A method according to claim 27, wherein in addition, the method comprises returning said field applied to the second layer of material whose volume is responsive to the magnitude of said field to its original state at a position of the press to make said key return to its original state.

30. An electronic device comprising:

a layer comprising material whose volume is responsive to the magnitude of a field, said field being one of the following: electric field, magnetic field, both of the above; and means for altering the field in a wanted position in said layer to create a key for pressing by a user in that position, wherein the key is generated by causing an area of the layer to protrude from the surface in a specified position in the layer such that the key is distinguishable from a surrounding surface.

31. A manufacturing method for manufacturing a key element, wherein the manufacturing method comprises:

joining a layer comprising material whose volume is responsive to the magnitude of a field with means for altering said field at a specified position to create a key for pressing by a user, the field being one of the following: electric field, magnetic field, both of the above; and providing the means for altering the field with the ability to cause an area of the layer to protrude from a surface at the specified position to distinguish the key from the surface.

\* \* \* \* \*